United States Patent
Hanis et al.

(10) Patent No.: US 10,346,440 B2
(45) Date of Patent: **\*Jul. 9, 2019**

(54) MODEL NAVIGATION CONSTRAINED BY CLASSIFICATION

(71) Applicant: International Business Machines Corporation, Armonk, NY (US)

(72) Inventors: Thomas T. Hanis, Raleigh, NC (US); Eoin Lane, Littleton, MA (US); Donnie A. Smith, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 14/812,387

(22) Filed: Jul. 29, 2015

(65) Prior Publication Data
US 2016/0162566 A1 Jun. 9, 2016

Related U.S. Application Data

(63) Continuation of application No. 14/564,699, filed on Dec. 9, 2014.

(51) Int. Cl.
| | | |
|---|---|---|
| *G06F 16/28* | (2019.01) | |
| *G06F 16/245* | (2019.01) | |
| *G06F 16/2457* | (2019.01) | |
| *G06Q 10/06* | (2012.01) | |

(52) U.S. Cl.
CPC ......... *G06F 16/285* (2019.01); *G06F 16/245* (2019.01); *G06F 16/24575* (2019.01); *G06F 16/288* (2019.01); *G06Q 10/06* (2013.01); *G06Q 10/067* (2013.01)

(58) Field of Classification Search
CPC ......... G06F 17/30604; G06F 17/30448; G06F 17/30528; G06F 16/288; G06F 16/2457; G06F 16/24573; G06F 16/24575
See application file for complete search history.

(56) References Cited

U.S. PATENT DOCUMENTS

| | | | |
|---|---|---|---|
| 6,678,705 B1 * | 1/2004 | Berchtold | ......... G06F 17/30011 707/204 |
| 8,666,951 B2 | 3/2014 | Hanis et al. | |
| 8,738,606 B2 * | 5/2014 | Sarma | ............... G06F 17/30528 707/713 |
| 8,812,452 B1 * | 8/2014 | Hushon | ............. G06F 17/30448 707/661 |

(Continued)

*Primary Examiner* — Marc S Somers
(74) *Attorney, Agent, or Firm* — Terrile, Cannatti & Chambers, LLP; Stephen A. Terrile

(57) ABSTRACT

A method, system and computer-usable medium are disclosed for efficient searching of a semantic model of resources and resource relationships. A query is received from an application. In turn the query is processed to determine an application usage classification for the application, which is then used to reference an index of subsets of the semantic model to identify a subset of the semantic model associated with the application usage classification. The identified subset of the semantic model is then used to modify the query, which is then used as a modified query to query the semantic model. In response, a sub-graph of the semantic model corresponding to the subset of the semantic mode is received, which in turn is provided to the application.

6 Claims, 6 Drawing Sheets

(56) References Cited

U.S. PATENT DOCUMENTS

| | | | |
|---|---|---|---|
| 8,819,000 B1* | 8/2014 | Acharya | G06F 17/30 707/723 |
| 2006/0122979 A1* | 6/2006 | Kapur | G06F 17/30648 707/3 |
| 2010/0011145 A1 | 1/2010 | Carver et al. | |
| 2010/0268722 A1* | 10/2010 | Yalamanchi | G06F 17/30958 707/759 |
| 2011/0099139 A1* | 4/2011 | Coldicott | G06Q 10/06 706/47 |
| 2012/0239643 A1* | 9/2012 | Ekstrand | G06F 17/30672 707/723 |
| 2012/0278353 A1* | 11/2012 | Carrato | G06F 17/30943 707/769 |
| 2013/0159320 A1 | 6/2013 | Gao et al. | |
| 2013/0262367 A1 | 10/2013 | Coldicott et al. | |

* cited by examiner

MODEL NAVIGATION CONSTRAINED BY CLASSIFICATION

CONTINUING DATA

This application is a continuation of U.S. patent application Ser. No. 14/564,699, filed Dec. 9, 2014, entitled "Model Navigation Constrained by Classification" which includes exemplary systems and methods and is incorporated by reference in its entirety.

BACKGROUND OF THE INVENTION

Field of the Invention

The present invention relates in general to the field of computers and similar technologies, and in particular to software utilized in this field. Still more particularly, it relates to a method, system and computer-usable medium for efficient searching of a semantic model of resources and resource relationships.

Description of the Related Art

An entity-relationship (ER) model is a data model that provides a systematic way of describing the data or information aspects of a business domain or its process requirements. The business domain, or its process requirements, is modeled as entities (i.e., things or resources) that are characterized by various attributes (i.e., characteristics or properties). These entities are linked to one another by relationships that express the dependencies and requirements between them. Diagrams created to graphically represent these entities, attributes, and relationships are referred to as entity-relationship diagrams. A common need in information systems is to search through a collection of these entities in a model for those entities with predetermined attributes or relationships.

Such information models are often used in software applications to capture relevant information about entities. The modeled entities, therefore, can be diverse and include physical assets, operations, organizations, metadata, or other related items. Relationships between those entities are equally diverse as they can represent a very broad set of associations. As an example, a city water infrastructure system may be modeled to show entities such as pipes, valves, flow meters, switches, regulators, etc. and their relationship to one another. These relationships may include physical connections, device types or manufacturer, purchase and installation dates, supplier information, and installation teams or contractors. Other relationships may include geospatial mapping within other city infrastructures, such as buildings, roads, sidewalks, subways, failure incidents, maintenance records, and so forth.

It is also typical to represent information models as graphs, where nodes represent the modeled entities and edges between nodes represent a predetermined relationship. With this representation of a domain, the model can be navigated in un-prescribed ways to discover new or extended relationships between entities and entity associations. Such newly-discovered information can often assist in converting data into meaningful insights that can lead to optimization of business operations or processes. As a result, it may be advantageous to create informational models that are very complete and capture as many entities and relationships as possible in order to provide the basis for discovering previously unrealized associations.

However, achieving completeness in an information model can also lead to increased complexity, which in turn can create challenges in navigating the model when attempting to discover the paths that are most likely to provide meaningful relationships. Generally, this refinement or filtering is achieved by adding a series of "where" clauses, or functional equivalents, to model queries implemented model navigation. However, this approach complicates model navigation as the user or application needs to know which relationships to include or exclude. As an alternative, filtering may be done at the data analysis layer such that identified relationships are not prioritized at the time of graph interrogation, but instead, only after the data is retrieved. This approach is likewise not optimal, as more data needs to be moved from the model to the interrogating application and the logic of that refinement is moved as an application responsibility, or to the user if unqualified data is represented for their consideration.

SUMMARY OF THE INVENTION

A method, system and computer-usable medium are disclosed for efficient searching of a semantic model of resources and resource relationships. In various embodiments, a query is received from an application. In turn, the query is processed to determine an application usage classification for the application, which is then used to reference an index of subsets of the semantic model to identify a subset of the semantic model associated with the application usage classification. The identified subset of the semantic model is then used to modify the query, which is then used as a modified query to query the semantic model. In response to using the modified query, a sub-graph of the semantic model corresponding to the subset of the semantic mode is received, which in turn is provided to the application.

In various embodiments, the semantic model is an entity-relationship model and the index is a topic map. In these embodiments, the application usage classification includes at least one application usage attribute. In various embodiments, the application usage attribute may include the application's vertical, role, or business responsibility. In certain embodiments, the usage attribute defines the contextual use of the application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
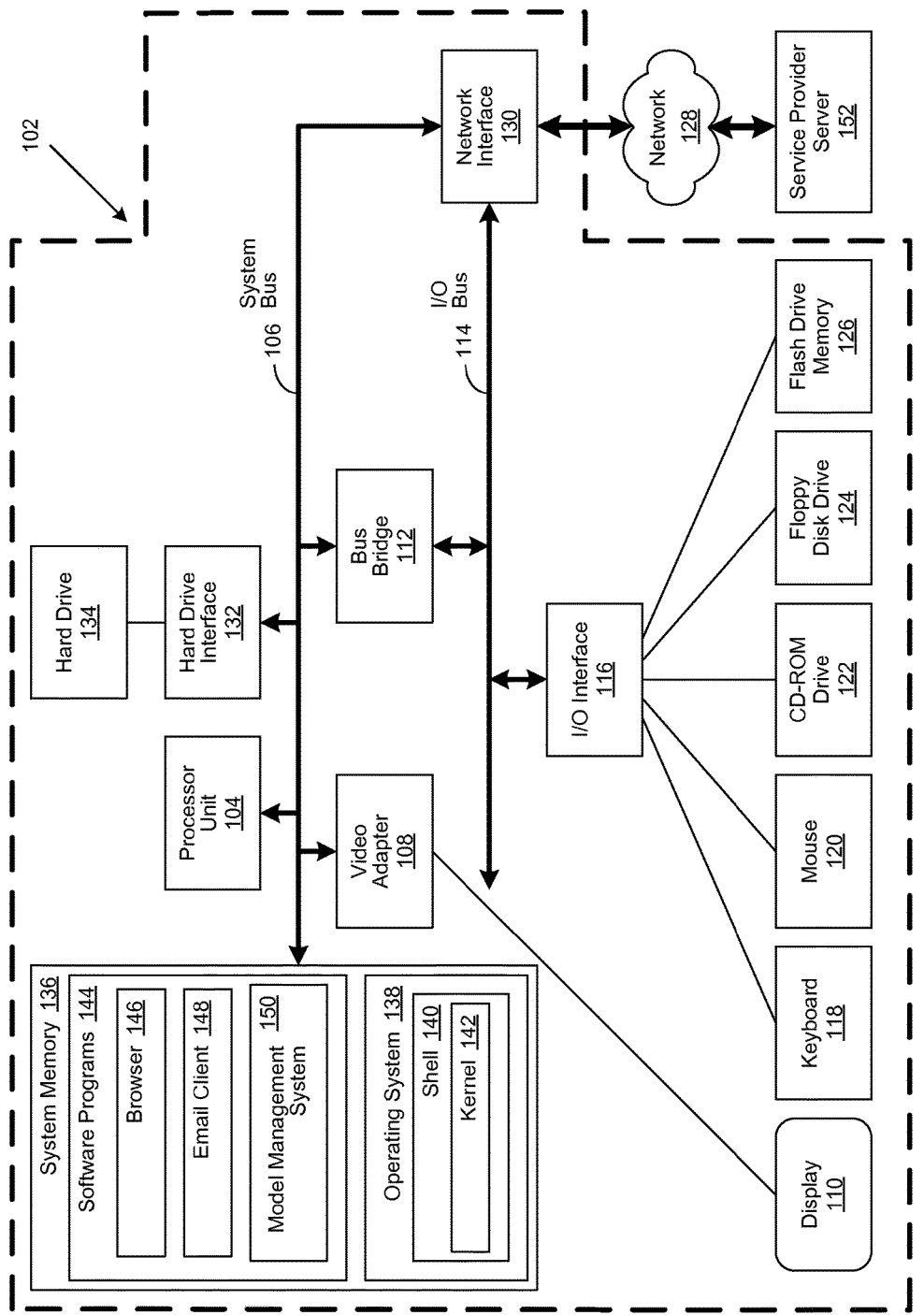
FIG. 1 depicts an exemplary client computer in which the present invention may be implemented.

A method, system and computer-usable medium are disclosed for efficient searching of a semantic model of resources and resource relationships. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a model management system 150. In these and other embodiments, the model management system 150 includes code for implementing the processes described hereinbelow. In one embodiment, client computer 102 is able to download the model management system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
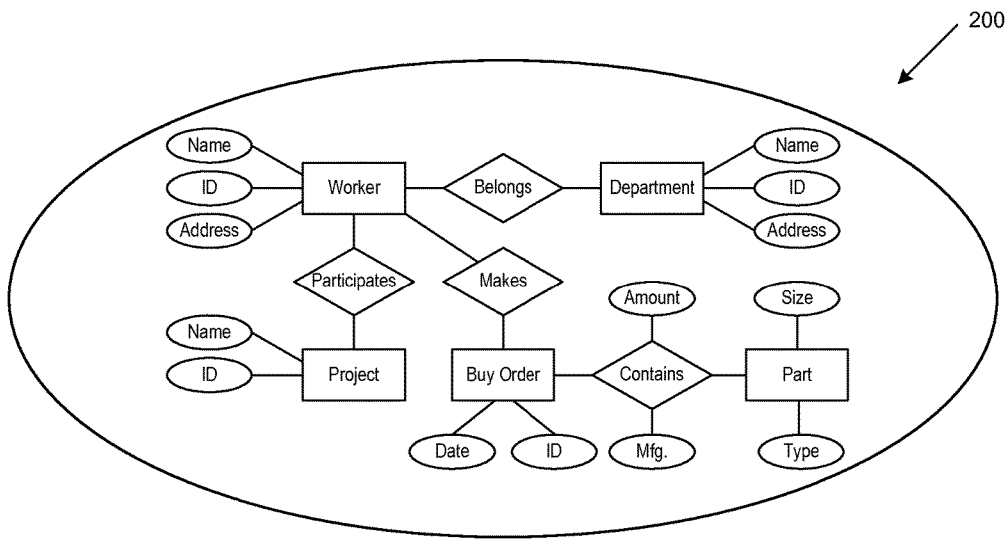
FIG. 2 is a simplified graphical depiction of an entity relationship model (ERM)

FIG. 2 is a simplified graphical depiction of an entity-relationship model (ERM) implemented in accordance with an embodiment of the invention. As used herein, an ERM 200 broadly refers to a data model that provides an abstract and conceptual representation of data. Accordingly, it is common to use entity-relationship modeling to produce a conceptual schema or semantic data model of a system, and its requirements, in a top-down manner.

Skilled practitioners of the art will be aware that such conceptual schemas and semantic data models are often used to provide a systematic way of describing the data or information aspects of a business domain, its process requirements, or both. These information aspects are modeled as entities (i.e., things or resources) that are characterized by various attributes (i.e., characteristics or properties). In turn, these entities are linked to one another by relationships that express their respective dependencies and requirements. Diagrams created to graphically represent these entities, attributes, and relationships are generally referred to as an entity-relationship diagram (ERD).

As an example, an ERM 200 can be used to describe physical systems, such as a water delivery system in a metropolitan area, which typically involves the use of various management systems. To extend the example, there are Supervisory Control and Data Acquisition (SCADA) systems that control and store instrumentation readings from equipment in the field. There are also Enterprise Asset Management (EAM) systems to manage the inventory and periodic servicing of equipment in the field. Likewise, a Customer Relationship Management (CRM) system provides information concerning customer accounts. For instance, a CRM system for a water company may list households, their corresponding water meter identifiers, and associated water usage. Likewise, a Geographic Information Systems (GIS) provides spatial mapping of assets and networks, such as valves, meters and pipelines.

Those of skill in the art will be aware that each of these systems provides logical relationship information relevant to its particular domain. For example, the modeled entities may include physical assets, operations, organizations, metadata, or other related items. Relationships between those entities are equally diverse as they can represent a very broad set of associations. To continue the preceding example, a water delivery system may be modeled to show entities such as pipes, valves, flow meters, switches, regulators, etc. and their relationship to one another.

These relationships may include physical connections, device types or manufacturer, purchase and installation dates, supplier information, and installation teams or contractors. Other relationships may include geospatial mapping within other city infrastructures, such as buildings, roads, sidewalks, subways, failure incidents, maintenance records, and so forth. To further the example, a set of pressure valves within the water delivery system may belong to a particular pressure management zone. As a result, the logical and abstract relationships provided by an ERM 200 can provide insight as to whether a sewer blockage at a particular location would have an adverse impact to water flowing at some distance away.

However, identifying previously unrealized relationships and associations between entities can prove challenging when navigating the model, especially when the model is complex and is used to support a multitude of applications. Identifying such relationships and associations is typically achieved by adding a series of "where" clauses, or functional equivalents, to model queries during navigation of the model. However, this approach complicates navigation of the model as the user or application needs to know which relationships to include or exclude. As an alternative, filtering may be done at the data analysis layer such that identified relationships are not prioritized at the time of graph interrogation, but instead, only after the data is retrieved. This approach is likewise not optimal, as more data needs to be moved from the model to the interrogating application for refinement. Furthermore, the logic needed to refine that data is likewise moved to the application, or to the user, if unqualified data is represented for their consideration.

Figure 3:
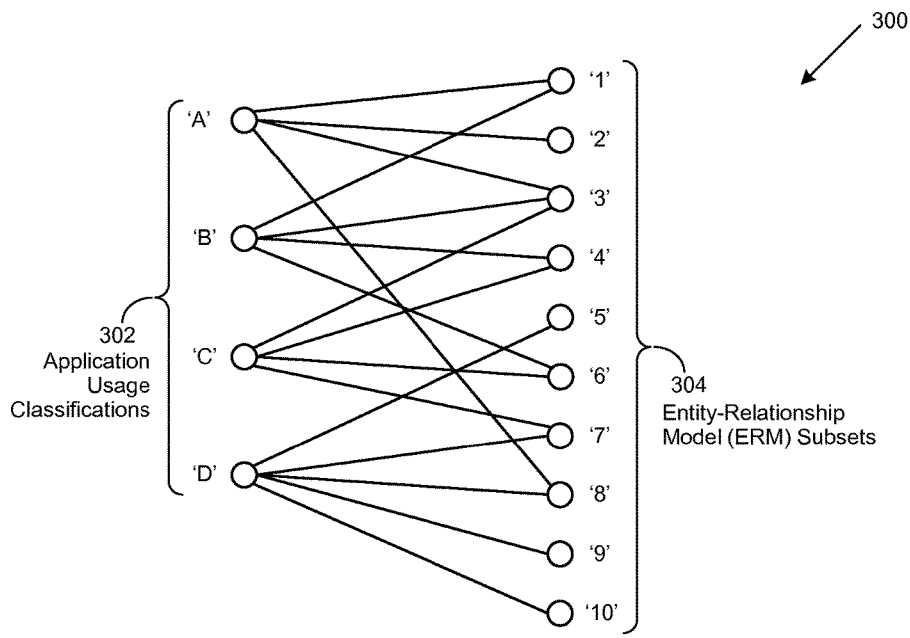
FIG. 3 is a simplified graphical depiction of a topic map.

FIG. 3 is a simplified graphical depiction of a topic map implemented in accordance with an embodiment of the invention. As used herein, a topic map 300 broadly refers to a standard for the representation and interchange of knowledge. Skilled practitioners of the art will be familiar with topic maps 300, which facilitate the location of information through the implementation of a meta-model. Such meta-models allow topics, associations, and occurrences to be typed, where the types are defined by the one or more creators of the topic map 300. The definitions of allowed types are in turn used to provide the ontology of the topic map 300.

In various embodiments, a topic map 300 is implemented to map a set of application usage classifications 302 'A' through 'D' to a set of ERM subsets 304 '1' through '10'. As used herein, an application usage classification broadly refers to a set of application usage attributes that defines the contextual use of an application. For example, in various embodiments, these application usage attributes may include the applications vertical, role or business responsibility. As used herein, an application usage attribute of "vertical" broadly refers to a vertical market or industry associated with a particular application. As an example, the associated vertical market or industry may be water utilities. As likewise used herein, an application usage attribute of "role" broadly refers to an organization or individual that would use the application. To continue the preceding example, the role of a water utility application may be its use by a water utility's pipeline management or billing departments.

Likewise, as used herein, an application usage attribute of "business responsibility" broadly refers to the application's intended business purpose. To further the preceding example, one water utility application may be used by a water utility's pipeline management department to monitor the flow of water across a network of pipes, while another may be used by a water utility's billing department to collect water usage metric and generate an associated bill. Likewise, yet another water utility application may be used to schedule periodic maintenance of valves throughout a pipeline network, while yet still another may be used to track associated pipeline maintenance costs. In certain embodiments, the application usage classification may be defined by other application usage attributes. Those of skill in the art will recognize that many such application usage attributes are possible and the foregoing is not intended to limit the spirit, scope or intent of the invention.

As likewise used herein, an ERM subset broadly refers to a predetermined set of entities within an ERM, such as the ERM 200 depicted in FIG. 2, and the associated relationships that represent their respective dependencies and requirements. More particularly, as shown in FIG. 3, the topic map 300 represents the mapping of application usage classification 'A' to ERM subsets '1', '2', '3' and '8', while application usage classification 'B' is mapped to ERM subsets '1', '3', '4' and '6'. Likewise, application usage classification 'C' is mapped to ERM subsets '3', '4', '6' and '7', while application usage classification 'D' is mapped to ERM subsets '5', '7', '8', '9' and '10'.

Skilled practitioners of the art will be aware that applications that use information models to represent relationships between various entities typically provide an interface to query the model. However, such interfaces generally expect either the application developer, or the user, to be responsible for prioritizing and constraining navigation of the model in a way that is consistent with the usage of the application. For example, a well-constructed meta-model may contain information about a city's water distribution network that includes assets such as pipes, valves, pumps, pressure sensors and so forth. Additionally, it may also contain interrelationship information related to maintenance data, asset manufacturer, device serial-number-level data, costing information, invoice references, and installation crew information.

While the availability of these extended relationships is valuable, it can also place a corresponding development burden on the application programmer. Likewise, the user of an application may be flooded with extraneous information that adds little value. These issues are addressed in various embodiments by prioritizing and constraining traversal of the model according to each application's associated usage classifications without additional coding effort. In these and other embodiments, the traversal of the model is constrained to a sub-graph of the ERM that is defined by those entity relationships referenced by an application usage classification associated with the querying application.

Figure 4:
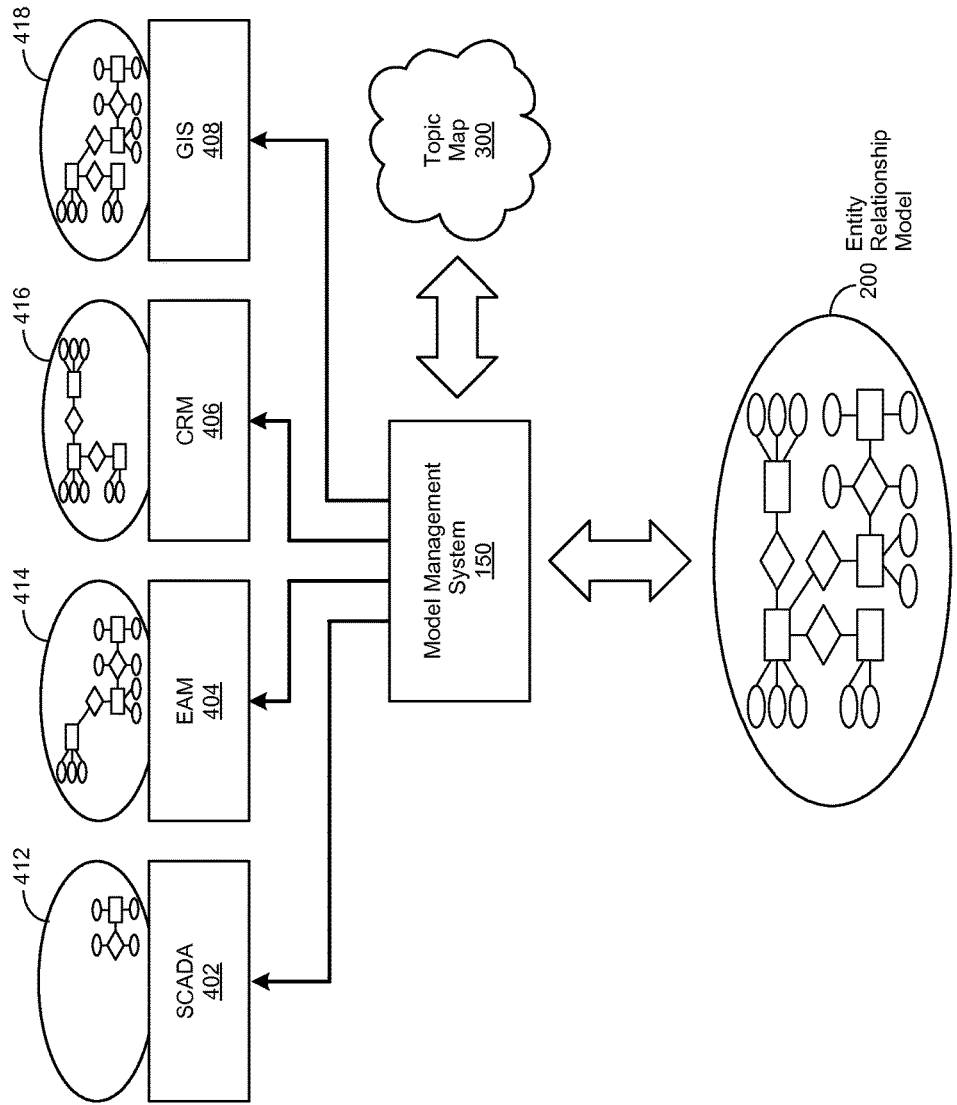
FIG. 4 is a simplified block diagram of a topic map implemented to provide a sub-graph of an ERM to an associated application.

FIG. 4 is a simplified block diagram of a topic map implemented in accordance with an embodiment of the invention to provide a sub-graph of an entity model-relationship model (ERM) to an associated application. In various embodiments, an application usage classification is generated, its related application usage attributes defined as described in greater detail herein, and then assigned to a target application. In certain embodiments, a model management system 150 is implemented to generate the application usage classifications and to define their related application usage attributes. The particular method by which the application usage classification is generated and its related application usage attributes are defined is a matter of design choice.

In certain embodiments, the application usage classifications may relate to various uses of the application, such as asset maintenance, workflow optimization, capital equipment optimization, infrastructure usage, and so forth. As an example, an ERM 200 may be used to describe physical systems, such as a water delivery system in a metropolitan area, which may involve the use of various applications. To extend the example, a Supervisory Control and Data Acquisition (SCADA) 402 application may be used to control and store instrumentation readings from equipment in the field. Likewise, an Enterprise Asset Management (EAM) 404 application may be used to manage the inventory and periodic servicing of equipment in the field. To continue the example, a Customer Relationship Management (CRM) 406 application may be used to provide information concerning customer accounts. For instance, a CRM 406 application for a water company may list households, their corresponding water meter identifiers, and associated water usage. Likewise, a Geographic Information Systems (GIS) 408 application may be used to provide spatial mapping of assets and networks, such as valves, meters and pipelines.

Referring now to FIG. 4, application usage classification mapping operations are initiated by the selection of a target application, such as the SCADA 402, EAM 404, CRM 406, or GIS 408 application. An application usage classification is generated, its related application usage attributes defined as described in greater detail herein, and then assigned to the target application. The ERM 200 is then processed to identify entity relationships, and their related entities, that correspond to the application usage classification attributes that were defined for the application usage classification.

In one embodiment, the identification process is performed using manual approaches. In another embodiment, the identification process is performed using automated approaches familiar to those of skill in the art. In yet another embodiment, the identification processed is performed using a combination of manual and automated approaches. The particular method by which the identification process is performed is a matter of design choice. Skilled practitioners of the art will recognize that there are many ways the identification process may be performed and the foregoing is not intended to limit the spirit, scope or intent of the invention.

The identified entity relationships, and their related entities, are then processed to generate a subset of the ERM 200, described in greater detail herein. The method by which the subset of the ERM 200 is generated is a matter of design choice. The resulting subset of the ERM 200 is then associated with the application usage classification in the topic map 300. In various embodiments, the model management system 150 is implemented to associate the subset of the ERM 200 with the application usage classification in the topic map 300.

In certain embodiments, mapping operations familiar to those of skill in the art are performed to associate the subset of the ERM 200 with the application usage classification in the topic map 300. In various embodiments, indexing operations familiar to those of skill in the art are performed to associate the subset of the ERM 200 with the application usage classification in the topic map. In certain embodiments, a combination of mapping and indexing operations are performed to associate the subset of the ERM 200 with the application usage classification in the topic map. The particular method by which the associating or indexing operations are performed is a matter of design choice.

In various embodiments, constrained navigation of the ERM 200 is initiated by the selection of a target application, such as the SCADA 402, EAM 404, CRM 406, or GIS 408 application, followed by the generation of an associated model query by the selected application. In one embodiment, the model query is automatically generated by the selected application. In another embodiment, the model query is generated in response to user input being received by the selected application. The resulting model query is then submitted to the ERM 200 for processing.

In various embodiments, the model query is intercepted by the model management system 150 and processed to determine the application usage classification associated with the querying application. The method by which the application usage classification is determined is a matter of design choice. As an example, the model query may have been generated by a water utility application used by a water utility's billing department to collect water usage metrics and generate an associated bill. In this example, the application may have a unique identifier, such as a product name, which is passed as part of the model query to the model management system 150. To continue the example, the model management system 150 may then parse the model query to extract the application's unique identifier and then use it to identify its associated application usage classification. Those of skill in the art will recognize that many such examples are possible and the foregoing is not intended to limit the spirit, scope or intent of the invention.

The model management system 150 then references the topic map 300 to identify the subset of the ERM 200 that corresponds to the application usage classification. The identified subset of the ERM 200 is then used by the model management system 150 to modify the model query, which is then used as a modified query to query the ERM 200. In response to using the modified query, a sub-graph of the ERM 200 corresponding to the subset of the ERM 200 is received. The resulting sub-graph is then provided to the querying application. For example, ERM sub-graphs 412, 414, 416 and 418 may be respectively provided by the model management system 150 to the SCADA 402, EAM 404, CRM 406, or GIS 408 applications.

Furthermore, the ERM sub-graphs 412, 414, 416 and 418 respectively provided to the SCADA 402, EAM 404, CRM 406, or GIS 408 applications as a result of otherwise unqualified model queries will only include data that is contextually-relevant to the querying application. Moreover, interrogation of the ERM 200 associated with various operations performed by the SCADA 402, EAM 404, CRM 406, or GIS 408 applications are automatically constrained without the need of delegating the mechanics of data filtering to either the user or the application. As a result, the entities within the ERM 200 selected by a query are determined according to an established context associated with the querying application.

Figure 5:
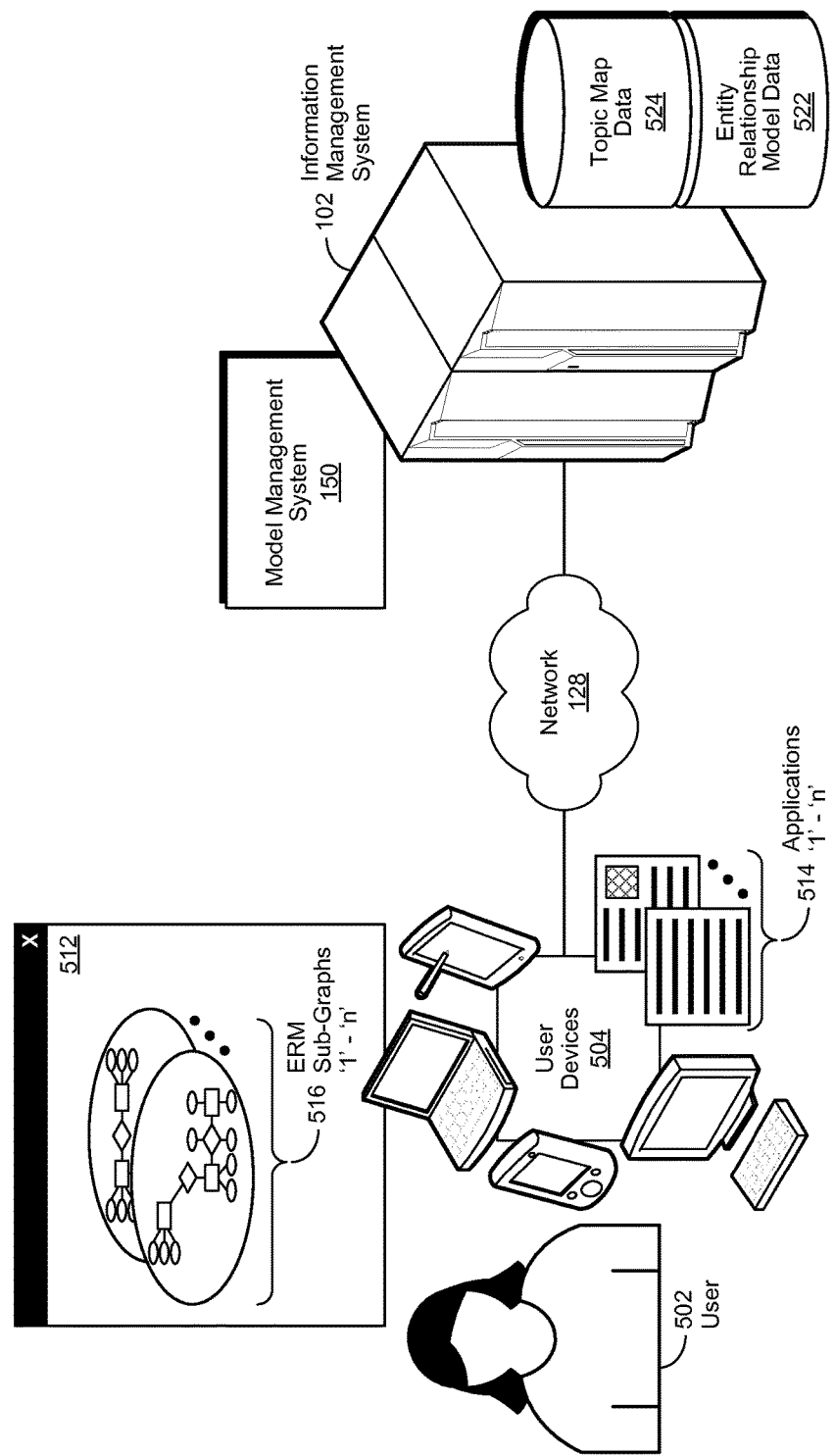
FIG. 5 is simplified block diagram of the operation of a model management system.

FIG. 5 is simplified block diagram of the operation of a model management system implemented in accordance with an embodiment of the invention. In various embodiments, an application usage classification is generated, its related application usage attributes defined as described in greater detail herein, and then assigned to a target application, such as applications '1' through 'n' 514. In certain embodiments, a model management system 150 is implemented to generate the application usage classifications and to define their related application usage attributes. The particular method by which the application usage classification is generated and its related application usage attributes are defined is a matter of design choice.

In various embodiments, the applications '1' through 'n' 514 are implemented on a user device 504 associated with a user 502. As used herein, a user device 504 refers to an information processing system such as a personal computer, a laptop computer, a tablet computer, a personal digital assistant (PDA), a smart phone, a mobile telephone, or other device that is capable of communicating and processing data. In various embodiments, the user device 504 is used to exchange information between the user 502 and an information management system 102 through the use of a network 128. In certain embodiments, the information management system 102 includes a model management system 150 and repositories of topic map data 524 and entity relationship model (ERM) data 522.

In various embodiments, the network 128 may be a public network, such as the Internet, a physical private network, a virtual private network (VPN), or any combination thereof. In certain embodiments, the network 228 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

Referring now to FIG. 5, application usage classification mapping operations are initiated by the selection of a target application, such as applications '1' through 'n' 514. An application usage classification is generated, its related application usage attributes defined as described in greater detail herein, and then assigned to the target application, such as applications '1' through 'n' 514. In turn, ERM data stored in the repository of ERM data 522 is processed to identify entity relationships, and their related entities, that correspond to the application usage classification attributes that were defined for the application usage classification.

The identified entity relationships, and their related entities, are then processed to generate a subset of the ERM, described in greater detail herein. The method by which the subset of the ERM is generated is a matter of design choice. The resulting subset of the ERM is then associated with the application usage classification in a topic map, as likewise described in greater detail herein. In certain embodiments, the topic map is stored in the repository of topic map data 524. In various embodiments, the model management system 150 is implemented to associate the subset of the ERM with the application usage classification in the topic map. In certain embodiments, mapping operations familiar to those of skill in the art are performed to associate the subset of the ERM with the application usage classification in the topic map.

In various embodiments, constrained navigation of the ERM is initiated by the selection of a target application, such as applications '1' through 'n' 514, followed by the generation of an associated model query by the selected application. In one embodiment, the model query is automatically generated by the selected application. In another embodiment, the model query is generated in response to a user 502 provided user input to the selected application. The resulting model query is then submitted by the querying application to the ERM for processing.

In various embodiments, the model query is intercepted by the model management system 150 and processed to determine the application usage classification associated with the querying application. The model management system 150 then references the repository of topic map data 524 to identify the subset of the ERM that corresponds to the application usage classification. The identified subset of the ERM is then used by the model management system 150 to modify the model query, which is then submitted to the ERM as a modified query. In various embodiments, the entities and entity relationships corresponding to the subset of the ERM is stored in the repository of ERM data 522.

In response to using the modified query, a sub-graph of the ERM corresponding to the subset of the ERM is received, which is then provided to the querying application.

For example, ERM sub-graphs '1' through 'n' 516 may be respectively provided by the model management system 150 to applications '1' through 'n' 514. In one embodiment, the ERM sub-graphs '1' through 'n' 516 are displayed within a user interface (UI) window 512 associated with a user device 504.

Figure 6:
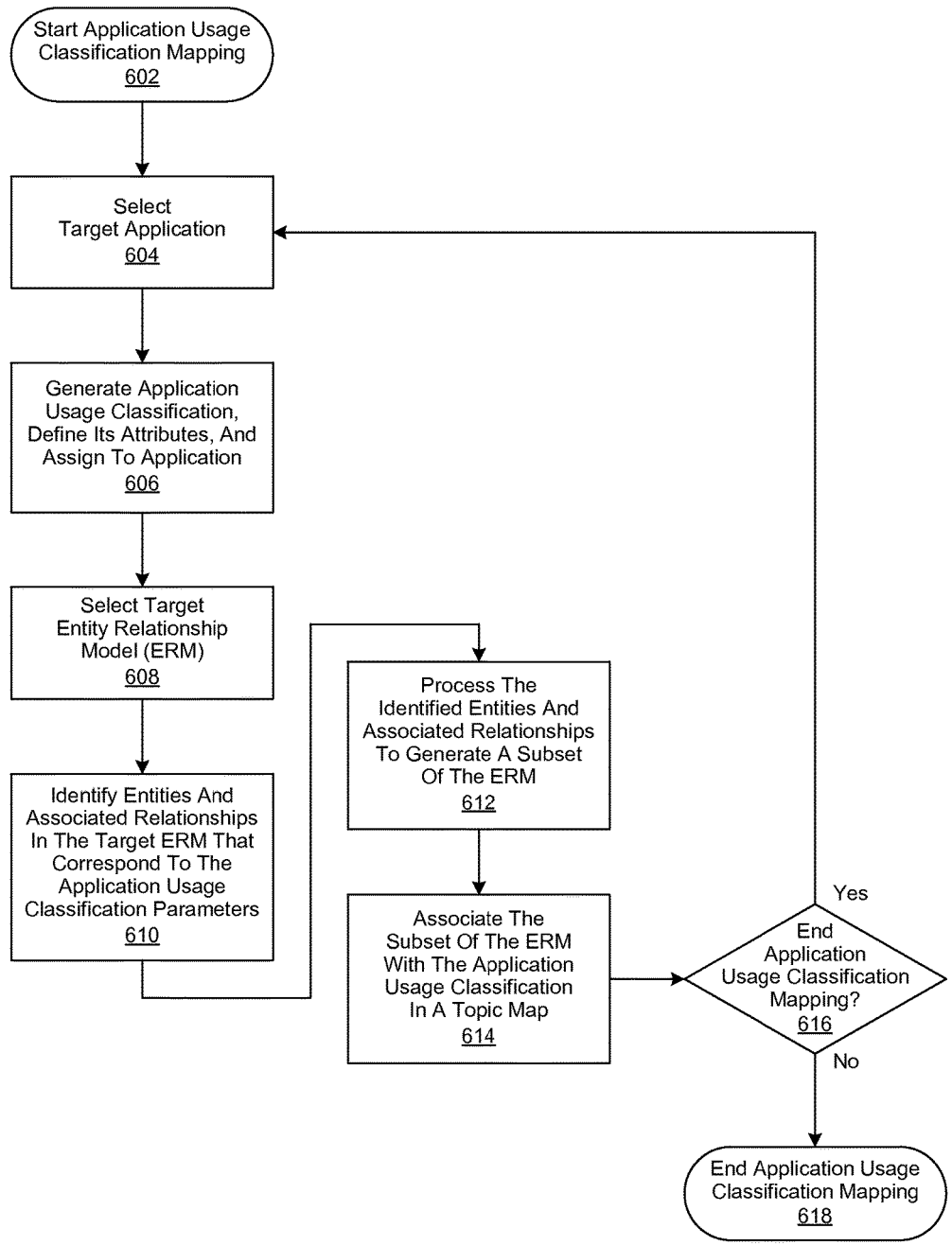
FIG. 6 is a generalized flowchart of the performance of application usage classification mapping operations.

FIG. 6 is a generalized flowchart of application usage classification mapping operations performed in accordance with an embodiment of the invention. In this embodiment, application usage classification mapping operations are begun in step 602, followed by the selection of a target application in step 604. Then, in step 606, an application usage classification is generated, its related application usage attributes defined as described in greater detail herein, and then assigned to the target application. A target entity-relationship model (ERM) is selected in step 608, followed by processing the selected ERM in step 610 to identify entity relationships, and their related entities, that correspond to the application usage classification attributes that were defined in step 606.

The identified entity relationships, and their related entities, are then processed in step 612 to generate a subset of the ERM, described in greater detail herein. The method by which the subset of the ERM is generated is a matter of design choice. Then, in step 614, the resulting subset of the ERM is associated with the application usage classification in a topic map, as described in greater detail herein. A determination is then made in step 616 whether to end application usage classification mapping operations. If not, then the process is continued, proceeding with step 604. Otherwise, application usage classification mapping operations ended in step 618.

Figure 7:
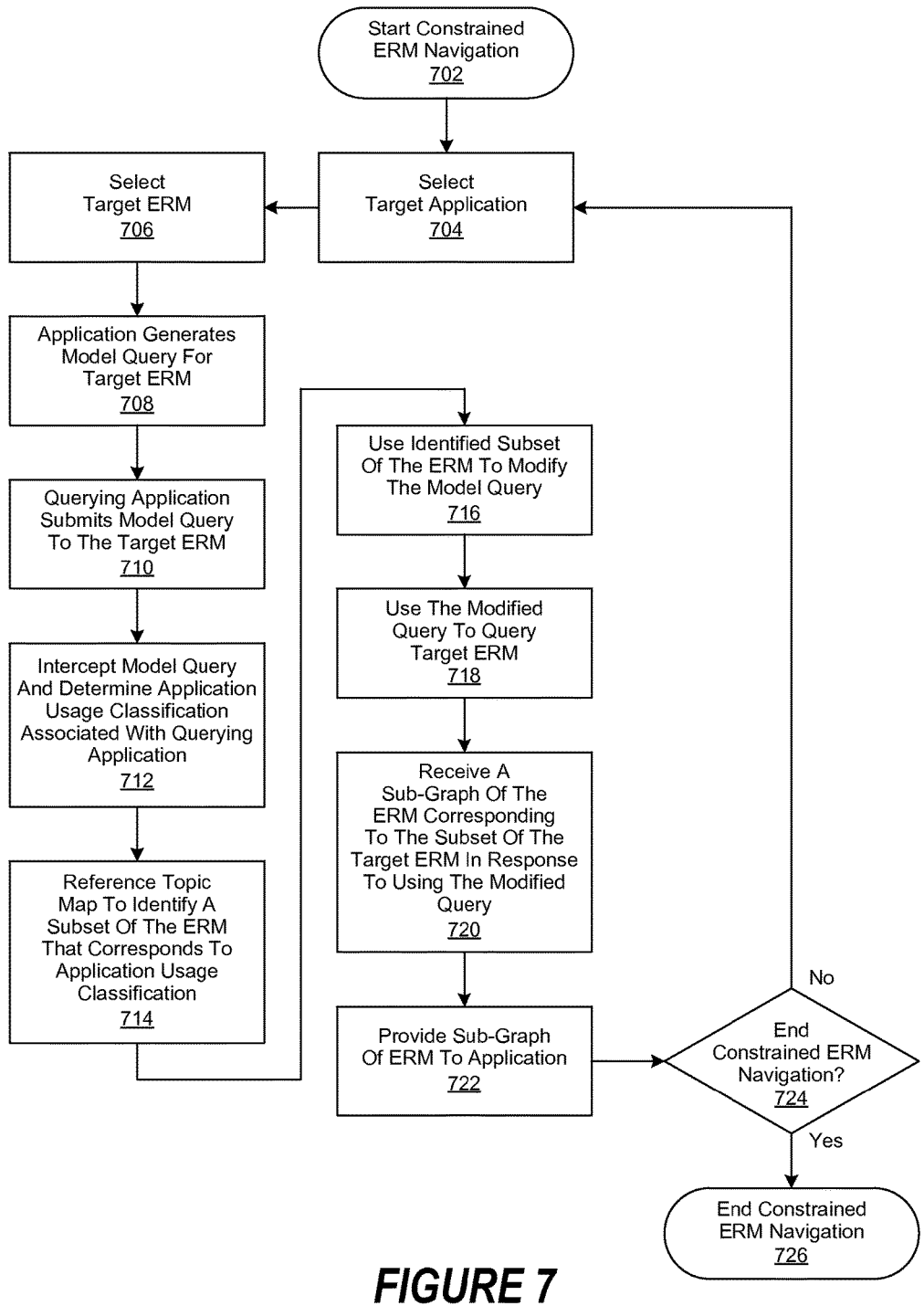
FIG. 7 is a generalized flowchart of the performance of constrained ERM navigation operations.

FIG. 7 is a generalized flowchart of constrained entity-relationship model (ERM) navigation operations performed in accordance with an embodiment of the invention. In this embodiment, constrained ERM navigation operations are begun in step 702, followed by the selection of a target application in step 704 and a target ERM in Step 706. Then, in step 708, a model query for the target ERM is generated by the selected application, which is then submitted to the target ERM by the querying application in step 710.

The model query is then intercepted in step 712 and the application usage classification associated with the querying application is determined. In various embodiments, a model management system, described in greater detail herein, is implemented to intercept the model query and determine the application usage classification associated with the querying application. In these embodiments, the method by which the model query is intercepted, and the application usage classification is determined, is matter of design choice.

A topic map, described in greater detail herein, is referenced in step 714 to identify the subset of the ERM subsets that corresponds to the application usage classification. The identified subset of the ERM subsets is then used in step 716 to modify the query, which is then used as a modified query to query the target ERM in step 718. In various embodiments, a model management system, described in greater detail herein, is implemented to first reference the topic map to identify the subset of the ERM and then use the identified subset of the ERM to modify the query. In certain embodiments, a model management system is likewise implemented to use the modified query to query the target ERM. In these embodiments, the method by which the model management system identifies the subset of the ERM, uses it to modify the query, and then uses the modified query to query the target ERM, is a matter of design choice.

A sub-graph of the ERM, corresponding to the subset of the ERM, is then received from the target ERM in step 720, which is then provided to the querying application in step 722. A determination is then made in step 724 whether to end constrained ERM navigation operations. If not, then the process is continued, proceeding with step 704. Otherwise, constrained ERM navigation operations are ended in step 726.

Although the present invention has been described in detail, it should be understood that various changes, substitutions and alterations can be made hereto without departing from the spirit and scope of the invention as defined by the appended claims.

What is claimed is:

1. A computer-implemented method for constrained entity-relationship model navigation of a semantic model of resources and resource relationships within a model management environment, the model management environment comprising a model management system executing on an information management system, a user device executing an application and a network, the model management system and the user device communicating via the network, comprising:
   submitting a model query from a querying application to the information management system via the network;
   intercepting the model query via the model management system;
   processing the intercepted query via the model management system to determine an application usage classification for the querying application;
   referencing a topic map of the semantic model to identify a subset of the semantic model associated with the application usage classification, the semantic model comprising an entity-relationship model and the subset of the semantic model comprising a sub-graph of the entity-relationship model;
   using the subset of the semantic model to modify the query;
   using the modified query to query the entity-relationship model of the semantic model;
   receiving the sub-graph of the entity-relationship model corresponding to the subset of the semantic model in response to using the modified query; and,
   providing the sub-graph of the entity-relationship model to the querying application; and wherein
   the constrained entity-relationship model navigation automatically constrains navigation of the semantic model without a need for delegating mechanics of data filtering to a user or the querying application.

2. The method of claim 1, wherein the semantic model contains information on resources and resource relationships organized according to application usage classifications.

3. The method of claim 1, wherein the application usage classification comprises at least one application usage attribute that is a member of the set of:
   a vertical;
   a role; and
   a business responsibility.

4. The method of claim 3, wherein the at least one application usage attribute defines the contextual use of the application.

5. The method of claim 1, wherein the set of application usage attributes comprise at least one application usage attribute that is a member of the set of:
   a vertical application usage attribute, the vertical application usage attribute referring to a vertical market associated with the application;
   a role application usage attribute, the role application usage attribute referring to an individual that would use the application; and
   a business responsibility usage attribute, the business responsibility usage attribute referring to an intended business purpose of the application.

6. A computer-implemented method for constrained entity-relationship model navigation of a semantic model of resources and resource relationships within a model management environment, the model management environment comprising a model management system executing on an information management system, a user device executing an application and a network, the model management system and the user device communicating via the network, comprising:
   submitting a model query from a querying application to the information management system via the network;
   intercepting the model query via the model management system;
   processing the intercepted query via the model management system to determine an application usage classification for the querying application, the application usage classification comprising a set of application usage attributes that define a contextual use of an application;
   referencing topic map of the semantic model to identify a subset of the semantic model associated with the application usage classification, the semantic model comprising an entity-relationship model and the subset of the semantic model comprising a sub-graph of the entity-relationship model;
   using the subset of the semantic model to modify the query;
   using the modified query to query the entity-relationship model of the semantic model;
   receiving the sub-graph of the entity-relationship model corresponding to the subset of the semantic model in response to using the modified query; and,
   providing the sub-graph of the entity relationship model to the querying application.

\* \* \* \* \*